United States Patent
Park et al.

(10) Patent No.: US 6,862,938 B1
(45) Date of Patent: Mar. 8, 2005

(54) DIFFERENTIAL CAPACITIVE TYPE MEMS SENSOR APPARATUS WITH CAPACITANCE COMPENSATOR HAVING MEMS STRUCTURE

(75) Inventors: Ho Joon Park, Seoul (KR); Kyoung Soo Chae, Seoul (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/792,897

(22) Filed: Mar. 5, 2004

(30) Foreign Application Priority Data

Dec. 23, 2003 (KR) ................................ 10-2003-0095795

(51) Int. Cl.$^7$ .............................. G01B 7/16; G01L 1/00
(52) U.S. Cl. ...................................................... 73/780
(58) Field of Search ........................ 73/780, 774, 763, 73/760, 862.632, 862.337, 862.626, 862.628, 862.629

(56) References Cited

U.S. PATENT DOCUMENTS 6,078,016 A * 6/2000 Yoshikawa et al. ...... 73/514.01

2002/0194919 A1 * 12/2002 Lee et al. ..................... 73/718

* cited by examiner

*Primary Examiner*—Edward Lefkowitz
*Assistant Examiner*—T Miller
(74) *Attorney, Agent, or Firm*—Lowe Hauptman Gilman & Berner, LLP

(57) ABSTRACT

Disclosed is a differential capacitive type MEMS sensor apparatus provided with a MEMS structure including a differential capacitive type MEMS sensor and a capacitance compensator having a MEMS structure. The differential capacitive type MEMS sensor apparatus includes a fixed frame unit including first and second fixed frames prepared in pairs, partially fixed to the MEMS base; a movable frame unit movably connected to the MEMS base substrate so that first capacitance is generated between the movable frame unit and the first fixed frame and second capacitance is generated between the movable frame unit and the second fixed frame; first capacitance compensating frame units serving to compensate for the first capacitance using capacitances generated between the movable frames and the movable electrodes; and second capacitance compensating frame units serving to compensate for the second capacitance using capacitances generated between the movable frames and the movable electrodes.

7 Claims, 4 Drawing Sheets

US 6,862,938 B1

DIFFERENTIAL CAPACITIVE TYPE MEMS SENSOR APPARATUS WITH CAPACITANCE COMPENSATOR HAVING MEMS STRUCTURE

BACKGROUND OF THE INVENTION

1. Field of the Invention

The present invention relates to a differential capacitive type MEMS (Micro Electro Mechanical System) sensor apparatus provided with a capacitance compensator having a MEMS structure, and more particularly to a differential capacitive type MEMS sensor apparatus provided with a capacitance compensator having a MEMS structure, which comprises a MEMS structure including a differential capacitive type MEMS sensor and the capacitance compensator, so that the capacitances of the MEMS sensor are compensated for by the capacitance compensator in real time, is manufactured by a simple process, thus reducing production cost, and has a reduced size.

2. Description of the Related Art

Recently, various sensors have been used as essential elements according to the development of a micro multi-function system. The sensors include an inertia sensor, a hands tremble-compensating sensor, a heat-detecting sensor, an infrared ray sensor, etc. In addition, high performance sensors are developed vigorously so as to be used for specific purposes. Important research objectives of the sensors, which are currently under development, are "how they are micro-Miniaturized" and "how their electric power consumption rates are minimized". Such objectives are achieved by a MEMS technique for manufacturing a three-dimensional movable structure by means of a semiconductor fabrication process. The structure includes a micro acceleration meter, a micro pressure gauge, etc. A MEMS (Micro Electro Mechanical System) denotes micro machinery used for electronic control and measurement purposes. That is, the MEMS is micro equipment, manufactured by a semiconductor fabrication process, which electronically operates and mechanically moves, thus differing from semiconductor devices. For example, one commonly used MEMS apparatus is an accelerometer of an air bag for a vehicle. The accelerometer has a micro size in order to sense fine variations in speed, and converts the movement of a speed meter located therein into voltage or current, thus determining whether or not the air bag should be operated. For this reason, the MEMS apparatuses have been applied to various micro sensors. Micro sensors using the MEMS technique are divided into capacitive type sensors and piezoelectric type sensors. Compared to the piezoelectric type sensors, the capacitive type sensors are advantageous in terms of ease of manufacture, heat characteristics, impact characteristics, operating frequency range, etc. However, the capacitive type sensors using the MEMS technique are disadvantageous in that capacitance thereof varies due to environmental changes such as temperature fluctuation, fine errors generated in a manufacturing process, and parasitic elements, without external input. Thus, the variation of the capacitance must be compensated for. One conventional method for compensating for the capacitance is described with reference to FIG. 1.

FIG. 1 is a circuit diagram illustrating the capacitance compensation of a conventional differential capacitive type MEMS sensor. When external physical force in a designated direction is applied to the conventional differential capacitive type MEMS sensor 110 shown in FIG. 1, capacitance exhibited between a movable structure and a fixed frame unit, located therein, is changed. The conventional differential capacitive type MEMS sensor 110 achieves a sensing function using the changed capacitance. In order to improve sensing capacity, the sensor 110 is a capacitive type, which comprises a differential structure and generates differential capacitances, such as a positive capacitance (+ΔC) and a negative capacitance (−ΔC), according to external force. The two capacitances are differentially amplified, thus allowing the sensitivity of the sensor 110 to be doubled.

Here, it is preferable that the positive and negative capacitances of the differential structure have the same value under the condition that external force is not applied to the sensor 110.

As described above, an error is generated between the differential capacitances, i.e., the positive and negative capacitances, due to various factors including a process error. In order to compensate for the error between the differential capacitances, the sensor 110 is connected to a capacitance compensating circuit 120 located outside, and capacities of variable capacitors C1 and C2 located in the capacitance compensating circuit 120 varies. Thereby, it is possible to compensate for the process error.

In the capacitance compensating circuit 120, a plurality of the variable capacitors C1 and C2 and a switching element for switching the connection of each of the variable capacitors C1 and C2 to the circuit 120 on/off. The switching of the switching element may be controlled by a digital signal of an external memory, or by means of a resistance element used for trimming.

Since the capacitances of the above-described conventional differential capacitive type MEMS sensor 110 are compensated for by means of a separately prepared circuit, the MEMS sensor 110 and the capacitance compensating circuit 120 must be respectively manufactured by additional processes. Further, since the capacitance compensating circuit 120 uses a plurality of the capacitors having a large size, the conventional differential capacitive type MEMS sensor 110 requires complicated designing and manufacturing processes, thus being increased in terms of size and production cost.

SUMMARY OF THE INVENTION

Therefore, the present invention has been made in view of the above problems, and it is an object of the present invention to provide a differential capacitive type MEMS sensor apparatus provided with a capacitance compensator having a MEMS structure, which comprises a MEMS structure including a differential capacitive type MEMS sensor and the capacitance compensator, so that the capacitances of the MEMS sensor are compensated for by the capacitance compensator in real time, is manufactured by a simple process, thus reducing production cost, and has a reduced size.

In accordance with the present invention, the above and other objects can be accomplished by the provision of a differential capacitive type MEMS sensor apparatus provided with a capacitance compensator having a MEMS structure, which is provided with a MEMS base substrate and a MEMS structure including fixed and movable frames supported by the base substrate, and has differential capacitances generated by external force, comprising: a fixed frame unit including first and second fixed frames prepared in pairs, partially fixed to the MEMS base substrate and separated from each other; a movable frame unit movably connected to the MEMS base substrate so that first capacitance is generated between the movable frame unit and the first fixed frame and second capacitance is generated between the movable frame unit and the second fixed frame, said first capacitance and said second capacitance constituting the differential capacitances; first capacitance compensating frame units, each including a movable frame movably connected to the first fixed frame of the fixed frame unit, and a movable electrode fixed to the MEMS base substrate, for moving the movable frame, and serving to compensate for the first capacitance using capacitances generated between the movable frames and the movable electrodes; and second capacitance compensating frame units, each including a movable frame movably connected to the second fixed frame of the fixed frame unit, and a movable electrode fixed to the MEMS base substrate, for moving the movable frame, and serving to compensate for the second capacitance using capacitances generated between the movable frames and the movable electrodes.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
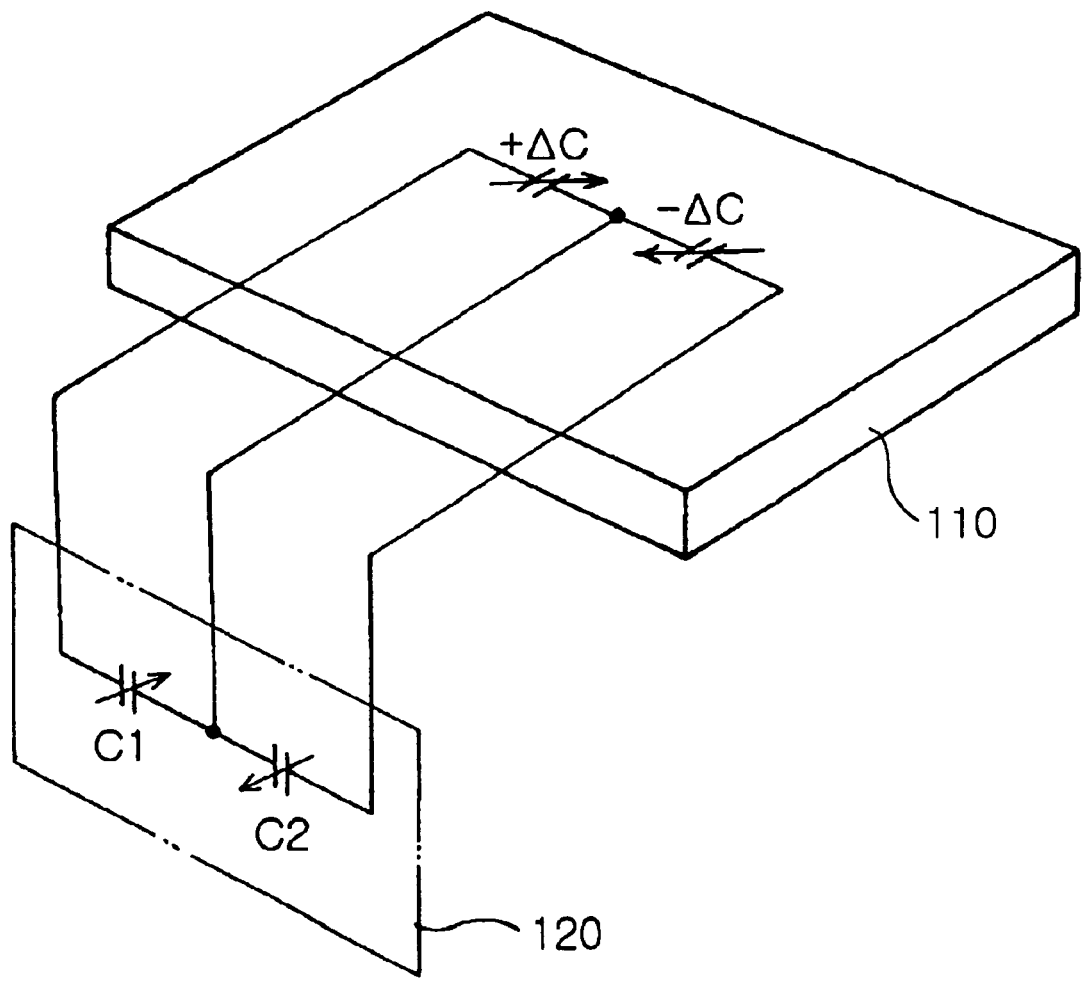
FIG. 1 is a circuit diagram illustrating the capacitance compensation of a conventional differential capacitive type MEMS sensor.

Now, preferred embodiments of the present invention will be described in detail with reference to the annexed drawings.

In the drawings, the same or similar elements are denoted by the same reference numerals even though they are depicted in different drawings.

Figure 2:
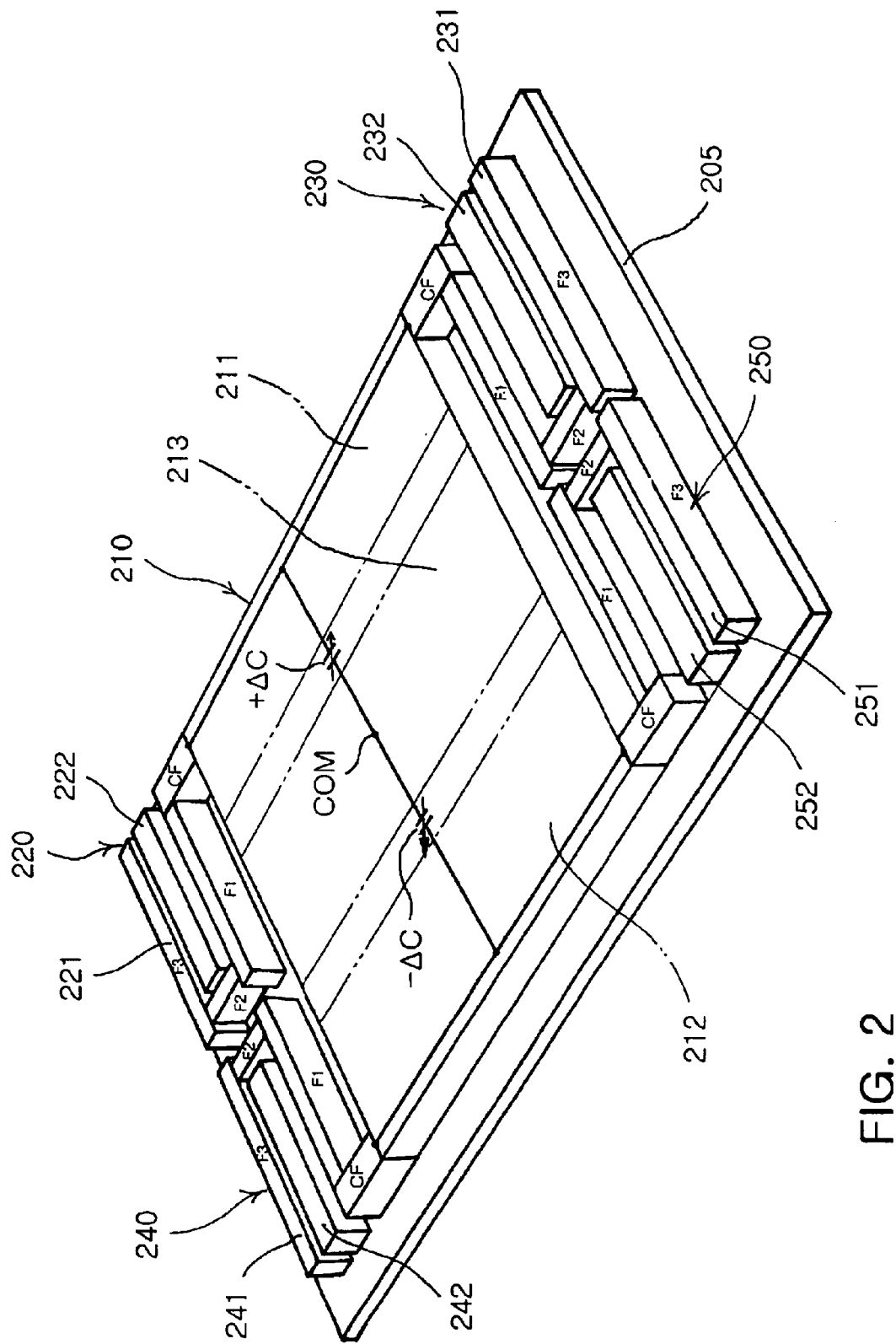
FIG. 2 is a perspective view of a differential capacitive type MEMS sensor apparatus in accordance with one embodiment of the present invention.

FIG. 2 is a perspective view of a differential capacitive type MEMS sensor apparatus in accordance with one embodiment of the present invention.

With reference to FIG. 2, the differential capacitive type MEMS sensor apparatus in accordance with one embodiment of the present invention has differential capacitances generated by external force, and comprises a base substrate 205, a MEMS structure including fixed and movable frames supported by the base substrate 205, a sensor unit 210 having a MEMS structure, and capacitance compensating units 220 to 250 having a MEMS structure.

The MEMS sensor unit 210 includes a fixed frame unit and a movable frame unit 213. The fixed frame unit includes first and second fixed frames 211 and 212 prepared in pairs and partially fixed to the MEMS base substrate 205. The first and second frames 211 and 212 are separated from each other. The movable frame unit 213 is movably connected to the MEMS base substrate 205 so that first capacitance (+ΔC) is generated between the movable frame unit 213 and the first fixed frame 211 and second capacitance (−ΔC) is generated between the movable frame unit 213 and the second fixed frame 212. The first capacitance (+ΔC) and the second capacitance (−ΔC) serve as differential capacitances of the differential capacitive type MEMS sensor apparatus.

The compensation of the differential capacitances of the MEMS sensor unit 210 is achieved by the MEMS capacitance compensating units 220 to 250. The MEMS capacitance compensating units 220 to 250 include first capacitance compensating frame units 220 and 230 and second capacitance compensating frame units 240 and 250.

First, the first capacitance compensating frame units 220 and 230 will be described in detail. The first capacitance compensating frame units 220 and 230 have the same structures, which are symmetrical centering on the fixed frame unit. Each of the first capacitance compensating frame units 220 and 230 includes a movable frame 221 or 231 movably connected to the first fixed frame 211 of the fixed frame unit, and a movable electrode 222 or 232, fixed to the MEMS base substrate 205, for moving the movable frame 221 or 231. The first capacitance compensating frame units 220 and 230 compensate for the first capacitance (+ΔC) using capacitances generated between the movable frames 221 and 231 and the movable electrodes 222 and 232.

More specifically, each of the movable frames 221 and 231 of the first capacitance compensating frame units 220 and 230 includes a connection frame (CF) connected to the first fixed frame 211 of the MEMS sensor unit 210, a first frame (F1) extended from the connection frame (CF), a second frame (F2) approximately perpendicularly extended from the first frame (F1), and a third frame (F3) approximately perpendicularly extended from the second frame (F2) and separated from the first frame (F1) by a designated distance.

Further, the movable electrodes 222 and 232 of the first capacitance compensating frame units 220 and 230 are located between the first and third frames (F1 and F3) of the movable frames 221 and 231, and are separated from the first and third frames (F1 and F3) by designated distances respectively. Here, the separation distance between the movable electrodes 222 and 232 and the first frame (F1) is larger than that between the movable electrodes 222 and 232 and the third frame (F3), thus generating large electrostatic force between the movable electrodes 222 and 232 and the second frame (F2).

Here, when driving voltage is supplied to the movable electrodes 222 and 232, electrostatic force is generated between the movable electrodes 222 and 232 and the movable frames 221 and 231. Then, the movable frames 221 and 231 move by the electrostatic force, and the separation distances thereof are varied, thereby varying capacitances between the movable frames 221 and 231 and fixation portions 213A and 213B of the movable frame 213 of the MEMS sensor unit 210. Since the above capacitances are connected to the first capacitance (+ΔC) generated between the movable frame unit 213 and the first fixed frame 211, the variation of the above capacitance causes the first capacitance (+ΔC) of the MEMS sensor unit 210 to vary.

Next, the second capacitance compensating frame units 240 and 250 will be described in detail. Each of the second capacitance compensating frame units 240 and 250 includes a movable frame 241 or 251 movably connected to the second fixed frame 212 of the fixed frame unit, and a movable electrode 242 or 252, fixed to the MEMS base substrate 205, for moving the movable frame 241 or 251. The second capacitance compensating frame units 240 and 250 compensate for the second capacitance (−ΔC) using capacitances generated between the movable frames 241 and 251 and the movable electrodes 242 and 252.

More specifically, each of the movable frames 241 and 251 of the second capacitance compensating frame units 240 and 250 includes a connection frame (CF) connected to the second fixed frame 212 of the MEMS sensor unit 210, a first frame (F1) extended from the connection frame (CF), a second frame (F2) approximately perpendicularly extended from the first frame (F1), and a third frame (F3) approximately perpendicularly extended from the second frame (F2) and separated from the first frame (F1) by a designated distance. Further, the movable electrodes 242 and 252 of the first capacitance compensating frame units 240 and 250 are located between the first and third frames (F1 and F3) of the movable frames 241 and 241, and are separated from the first and third frames (F1 and F3) by designated distances respectively. Here, the separation distance between the movable electrodes 242 and 252 and the first frame (F1) is larger than that between the movable electrodes 242 and 252 and the third frame (F3), thus generating large electrostatic force between the movable electrodes 242 and 252 and the second frame (F2).

Here, in the same manner as that of the first capacitance compensating frame units 220 and 230, when driving voltage is supplied to the movable electrodes 242 and 252, electrostatic force is generated between the movable electrodes 242 and 252 and the movable frames 241 and 251. Then, the movable frames 241 and 251 move by the electrostatic force, and the separation distances thereof are varied, thereby varying capacitances between the movable frames 241 and 251 and fixation portions 213A and 213B of the movable frame 213 of the MEMS sensor unit 210. Since the above capacitances are connected to the second capacitance ($-\Delta C$) generated between the movable frame unit 213 and the first fixed frame 211, the variation of the above capacitances causes the second capacitance ($-\Delta C$) of the MEMS sensor unit 210 to vary.

In FIG. 2, a non-described reference mark 'COM' represents a circuit common point.

That is, in the differential capacitive type MEMS sensor apparatus of the present invention, the variation of the capacitance is generated between the movable electrodes and the movable frames, and a degree of the variation of the capacitance is determined by a degree of the displacement of the movable frames and defined by Equation 1, as follows.

[Equation 1]

$$RM\ \Delta C = \epsilon \times A / \Delta gap$$

Here, $\epsilon$ (epsilon) denotes a permittivity constant, A denotes dimensions of a facing area of upper and lower electrodes, and $\Delta$gap denotes a distance between the two electrodes.

As shown in Equation 1, the capacitance is generated by the displacement of the movable structure, and can be compensated for by controlling a degree of the displacement of the movable structure.

Figure 3:
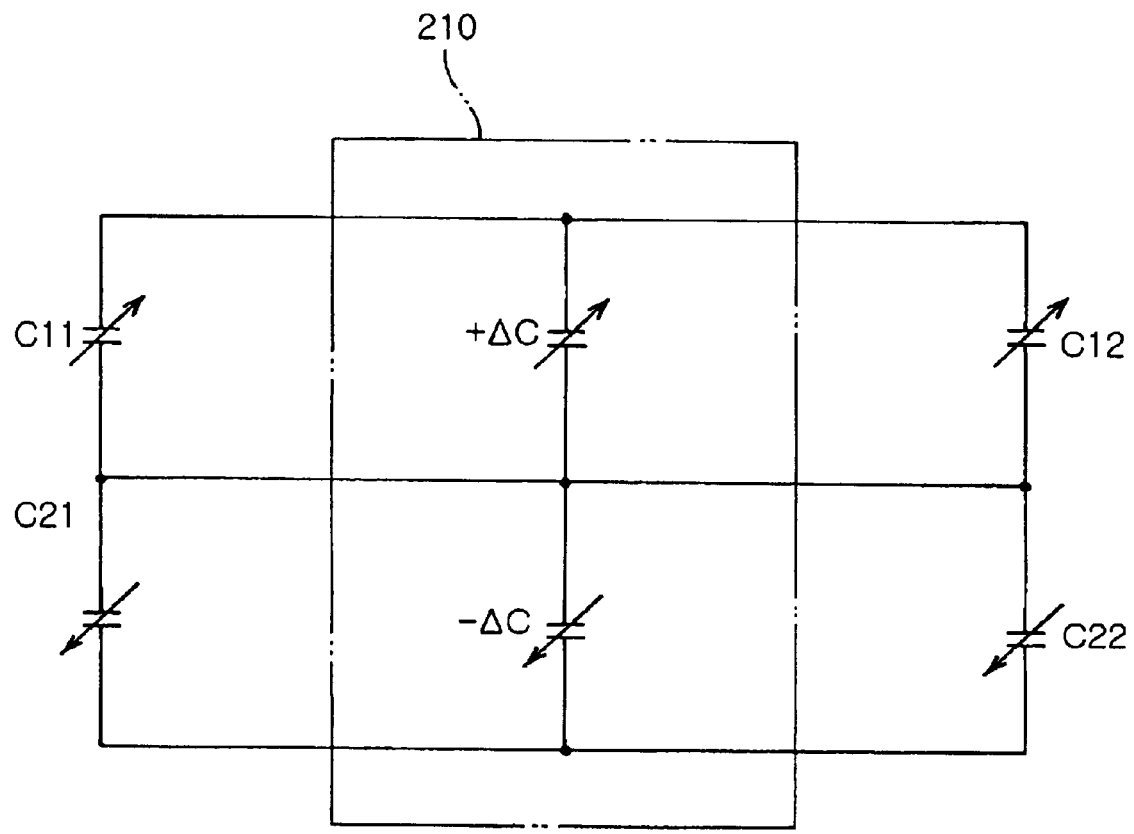
FIG. 3 is an equivalent circuit diagram of the differential capacitive type MEMS sensor apparatus of the present invention.

FIG. 3 is an equivalent circuit diagram of the differential capacitive type MEMS sensor apparatus of the present invention.

In FIG. 3, C11 and C12 represent capacitors compensated for by the first capacitance compensating frame units, and C21 and C22 represent capacitors compensated for by the second capacitance compensating frame units. As shown in FIG. 3, the first capacitance ($+\Delta C$), i.e., a positive capacitance, out of the differential capacitances ($+\Delta C$ and $-\Delta C$) of the sensor unit 210 is compensated for by the variation of the capacitors (C11 and C12) of the first capacitance compensating frame units, and the second capacitance ($-\Delta C$), i.e., a negative capacitance, out of the differential capacitances ($+\Delta C$ and $-\Delta C$) of the sensor unit 210 is compensated for by the variation of the capacitors (C21 and C22) of the second capacitance compensating frame units.

Figure 4:
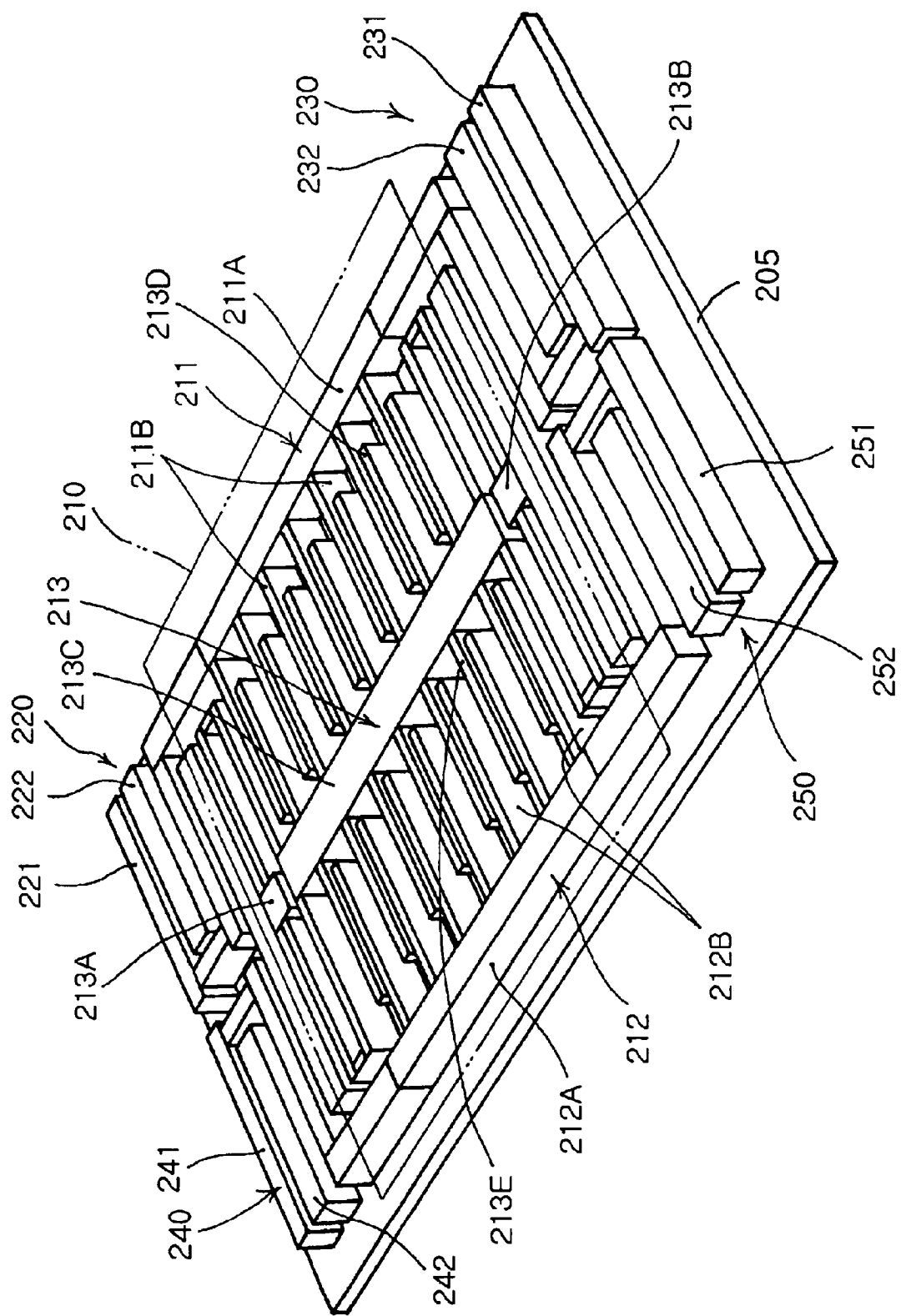
FIG. 4 is a perspective view of a differential capacitive type MEMS sensor apparatus in accordance with another embodiment of the present invention.

FIG. 4 is a perspective view of a differential capacitive type MEMS sensor apparatus in accordance with another embodiment of the present invention.

With reference to FIG. 4, the differential capacitive type MEMS sensor apparatus in accordance with another embodiment of the present invention has differential capacitances generated by external force, and comprises the base substrate 205, the MEMS structure including fixed and movable frames supported by the base substrate 205, the sensor unit 210 having a MEMS structure, and the capacitance compensating units 220 to 250 having a MEMS structure.

Here, the capacitance compensating units 220 to 250 are the same as those of the differential capacitive type MEMS sensor apparatus as shown in FIG. 2.

The MEMS sensor unit 210 includes the fixed frame unit and the movable frame unit 213. The fixed frame unit includes the first and second fixed frames 211 and 212 prepared in pairs and partially fixed to the MEMS base substrate 205. The first and second frames 211 and 212 are separated from each other. The movable frame unit 213 is movably connected to the MEMS base substrate 205 so that first capacitance ($+\Delta C$) is generated between the movable frame unit 213 and the first fixed frame 211 and second capacitance ($-\Delta C$) is generated between the movable frame unit 213 and the second fixed frame 212. The first capacitance ($+\Delta C$) and the second capacitance ($-\Delta C$) serve as differential capacitances of the differential capacitive type MEMS sensor apparatus.

The first fixed frame 211 includes a main frame 211A supported by the MEMS base substrate 205 and provided with both sides respectively connected to the capacitance compensating units 220 and 230, and a comb unit 211B including a plurality of teeth extended from the main frame 211A in the direction of the movable frame unit 213.

The second fixed frame 212 includes a main frame 212A supported by the MEMS base substrate 205 and provided with both sides respectively connected to the capacitance compensating units 240 and 250, and a comb unit 212B including a plurality of teeth extended from the main frame 212A in the direction of the movable frame unit 213.

The movable frame unit 213 includes fixed portions 213A and 213B partially fixed to the MEMS base substrate 205, a mass body 213C connected to the fixed portions 213A and 213B by a spring, a comb unit 213D, separated from the comb unit 211B of the first fixed frame 211, including a plurality of teeth extended from the mass body 213C so that the teeth are interdigitated with the teeth of the comb unit 211B of the first fixed frame 211, and a comb unit 213E, separated from the comb unit 212B of the first fixed frame 212, including a plurality of teeth extended from the mass body 213C so that the teeth are interdigitated with the teeth of the comb unit 212B of the first fixed frame 212.

In such a differential capacitive type MEMS sensor apparatus, the first capacitance ($+\Delta C$) generated between the movable frame unit 213 and the first fixed frame 211 is compensated for by the first capacitance compensating units 220 and 230, and the second capacitance ($-\Delta C$) generated between the movable frame unit 213 and the second fixed frame 212 is compensated for by the second capacitance compensating units 240 and 250.

As described above, the differential capacitive type MEMS sensor apparatus provided with the MEMS technique-based compensator compensates for capacitances in real time, and is simply manufactured, thereby reducing production cost. Further, in case that the compensator is integrally formed with a sensor, the differential capacitive type MEMS sensor apparatus has a remarkably reduced size.

As apparent from the above description, the present invention provides a differential capacitive type MEMS sensor apparatus, which comprises a MEMS structure including a differential capacitive type MEMS sensor and a capacitance compensator having a MEMS structure, so that the capacitances of the MEMS sensor are compensated for by the capacitance compensator in real time, is manufactured by a simple process, thus reducing production cost, and has a reduced size.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A differential capacitive type MEMS sensor apparatus provided with a capacitance compensator having a MEMS structure, which is provided with a MEMS base substrate and a MEMS structure including fixed and movable frames supported by the base substrate, and has differential capacitances generated by external force, comprising:

a fixed frame unit including first and second fixed frames prepared in pairs, partially fixed to the MEMS base substrate and separated from each other;

a movable frame unit movably connected to the MEMS base substrate so that first capacitance is generated between the movable frame unit and the first fixed frame and second capacitance is generated between the movable frame unit and the second fixed frame, said first capacitance and said second capacitance constituting the differential capacitances;

first capacitance compensating frame units, each including a movable frame movably connected to the first fixed frame of the fixed frame unit, and a movable electrode fixed to the MEMS base substrate, for moving the movable frame, and serving to compensate for the first capacitance using capacitances generated between the movable frames and the movable electrodes; and second capacitance compensating frame units, each including a movable frame movably connected to the second fixed frame of the fixed frame unit, and a movable electrode fixed to the MEMS base substrate, for moving the movable frame, and serving to compensate for the second capacitance using capacitances generated between the movable frames and the movable electrodes.

2. The differential capacitive type MEMS sensor apparatus as set forth in claim 1, wherein each of the first capacitance compensating frame units includes:

the movable frame movably connected to the first fixed frame of the fixed frame unit, said movable frames of the first capacitance compensating frame units being symmetrical centering on the fixed frame unit; and the movable electrode fixed to the MEMS base substrate, for moving the movable frame, wherein the first capacitance compensating frame units compensate for the first capacitance using capacitances generated between the movable frames and the movable electrodes.

3. The differential capacitive type MEMS sensor apparatus as set forth in claim 1, wherein each of the movable frames of the first capacitance compensating frame units includes:

a connection frame connected to the first fixed frame of a MEMS sensor unit;

a first frame extended from the connection frame;

a second frame approximately perpendicularly extended from the first frame; and a third frame approximately perpendicularly extended from the second frame, and separated from the first frame by a designated distance.

4. The differential capacitive type MEMS sensor apparatus as set forth in claim 3, wherein the movable electrodes of the first capacitance compensating frame units are separated from the first and third frames of the movable frames by designated distances and located between the first and third frames so that driving voltage is supplied to the movable electrodes in order to generate electrostatic force between the movable electrodes and the first and third frames.

5. The differential capacitive type MEMS sensor apparatus as set forth in claim 1, wherein each of the second capacitance compensating frame units includes:

the movable frame movably connected to the second fixed frame of the fixed frame unit; and the movable electrode fixed to the MEMS base substrate, for moving the movable frame, wherein the second capacitance compensating frame units compensate for the second capacitance using capacitances generated between the movable frames and the movable electrodes.

6. The differential capacitive type MEMS sensor apparatus as set forth in claim 5, wherein each of the movable frames of the second capacitance compensating frame units includes:

a connection frame connected to the second fixed frame of a MEMS sensor unit;

a first frame extended from the connection frame;

a second frame approximately perpendicularly extended from the first frame; and a third frame approximately perpendicularly extended from the second frame, and separated from the first frame by a designated distance.

7. The differential capacitive type MEMS sensor apparatus as set forth in claim 6, wherein the movable electrodes of the second capacitance compensating frame units are separated from the first and third frames of the movable frames by designated distances and located between the first and third frames so that driving voltage is supplied to the movable electrodes in order to generate electrostatic force between the movable electrodes and the first and third frames.

* * * * *